UNITED STATES PATENT OFFICE.

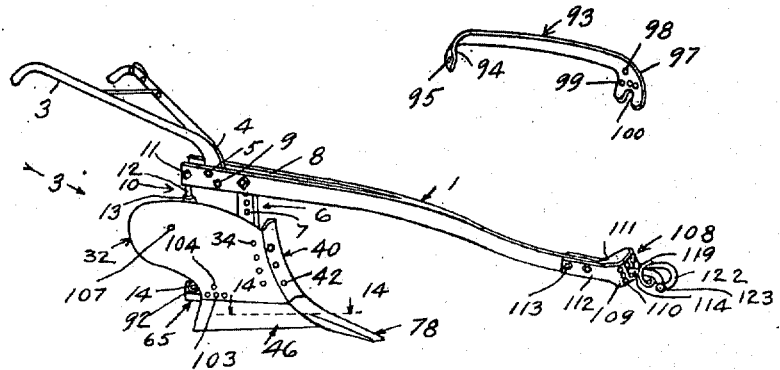

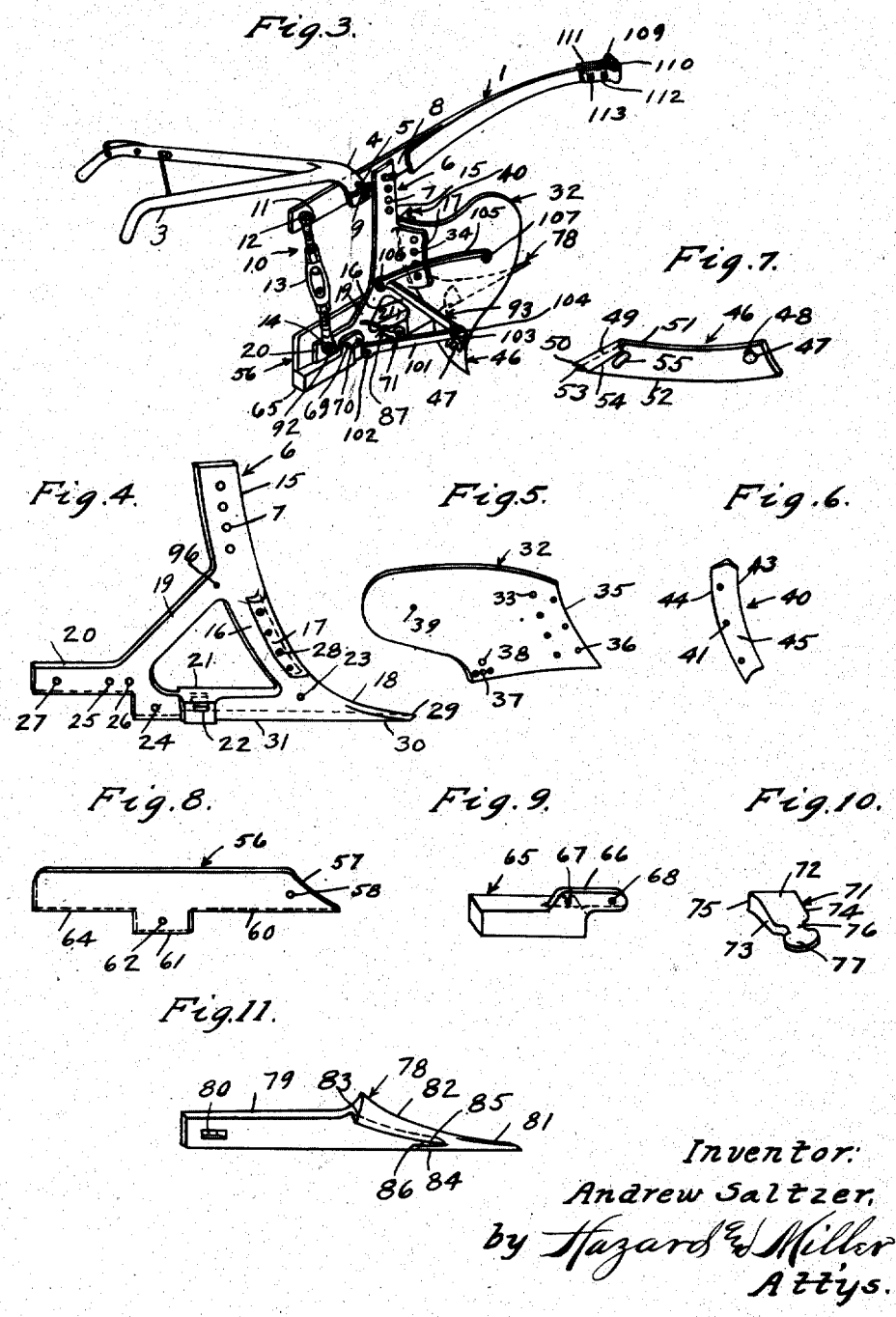

ANDREW SALTZER, OF SAWTELLE, CALIFORNIA.

PLOW.

1,280,088.　　　　　Specification of Letters Patent.　　Patented Sept. 24, 1918.

Application filed February 6, 1918. Serial No. 215,668.

*To all whom it may concern:*

Be it known that I, ANDREW SALTZER, a citizen of the United States, residing at Sawtelle, in the county of Los Angeles and State of California, have invented new and useful Improvements in Plows, of which the following is a specification.

My object is to make an improved sub-land plow and my invention consists in the novel features herein shown, described and claimed.

Figure 1 is a perspective of a sub-land plow embodying the principles of my invention, as seen from the mold board side.

Fig. 2 is a perspective as seen from the land-side.

Fig. 3 is a perspective as seen from the rear, as indicated by the arrows 3 in Figs. 1 and 2.

Fig. 4 is a perspective of the standard and frame upon which the mold board, the land-side, and other parts are mounted.

Fig. 5 is a perspective of the mold board.

Fig. 6 is a perspective of the shin.

Fig. 7 is a perspective of the plow share from the inside.

Fig. 8 is a perspective of the land-side from the inside.

Fig. 9 is a perspective of the heel protector from the rear and inside.

Fig. 10 is a perspective of the locking wedge.

Fig. 11 is a perspective of the plow point from the inside.

Fig. 12 is a perspective of the upper plow share brace.

Fig. 13 is a perspective of the wedge lock.

Fig. 14 is a fragmentary horizontal sectional detail on the line 14—14 of Fig. 1.

Fig. 15 is an enlarged fragmentary perspective of the assembled parts from the rear and inside of the land-side.

Fig. 16 is a fragmentary perspective of the draft adjuster at the forward end of the plow beam.

The plow beam 1 is formed of two flat metal bars forged together at their forward ends and spread apart at their rear ends, there being openings 2 in the forward end for the attachment of the draft rigging. The handles 3 extend from a shank 4 and said shank is inserted between the ends of the bars at the rear end of the plow beam 1 and secured by bolts 5. The upper end of the standard 6 has a plurality of bolt holes 7 and is placed in the slot 8 between the rear ends of the bars forming the plow beam 1 and secured adjustably in place by a bolt 9 so that by manipulating the bolt and moving it from hole to hole the plow beam 1 may be raised or lowered upon the standard 6. The upper end of the turn-buckle construction 10 is mounted in the slot 8 behind the shank 4 and secured in place by a bolt 11.

The turn-buckle construction 10 comprises the screw-eye 12, the turn-buckle 13, and the screw-eye 14.

The standard 6 comprises the shank 15 standing substantially vertical, the shank extension 16 extending downwardly and forwardly from the shank 15, the mold board attaching flange 17 extending toward the mold board from the forward edge of the extension 16, the plow point support 18 extending forwardly from the lower end of the extension 16, the brace 19 extending downwardly and backwardly from the junction of the shank 15 with the extension 16, the turn-buckle support 20 extending backwardly from the lower end of the brace 19, and the land-side support 21 connecting the plow point support 18 to the turn-buckle support 20; there being a rectangular opening 22 transversely through the central portion of the support 21, a bolt hole 23 through the lower end of the extension 16, a bolt hole 24 through the rear end of the support 21, a pair of bolt holes 25 and 26 through the forward end of the turn-buckle support 20, and a bolt hole 27 through the rear end of the turn-buckle support 20; and there being a series of bolt holes 28 through the mold board attaching flange 17, and the forward edge 29 of the point support 18 being transversely inclined, and the lower face 30 of the point support being on a level relative to the lower face 31 of the land-side support 21.

The mold board 32 has a series of bolt holes 33 registering with the bolt holes 28 in the flange 17, and bolts 34 are inserted through the mold board and through the flange to secure the mold board in place. The edge of the mold board extends beyond the edge of the extension 16 to form the shin support 35 and said support 35 has a series of bolt holes 36. A series of rivet holes 37 is formed through the lower rear corner of the mold board and a bolt hole 38 is formed near the rivet holes, and a bolt hole 39 is formed in the upper rear part of the mold board.

The shin 40 has bolt holes 41, and bolts 42 are inserted through these holes 41 and through the holes 36 to secure the cutter to the forward edge of the mold board 32. The shin 40 comprises a cutting edge flange 43 extending vertically in a plane slightly upon the land side of the extension 16, said cutting edge being curved in side elevation and extending from the lower front corner of the mold board to or above the top of the mold board, and the attaching flange 44 extends from the rear edge of the flange 43 and fits against the front face of the mold board, the wearing face 45 extending from the cutting edge of the flange 43 to the rear edge of the flange 44, being curved, and the material of the flange 44 being tapered so that the face 45 joins with the face of the mold board.

The plow share 46 has a stud 47 extending from its inner face near its rear end and a retaining lug 48 extends upwardly from the inner end of the stud. The inclined edge 49 extends from the point 50 to the upper edge 51, the point 50 being off-set from the line of the lower cutting edge 52 by a notch 53. A hooked flange 54 extends toward the land-side from the edge 49 and a lug 55 extends from the inner face near the hooked flange 54.

The land side 56 has a curved forward edge 57, the upper part of said edge fitting against the rear face of the support 35 and a bolt hole 58 formed transversely through the forward end of the land side registers with the bolt hole 23, and a bolt 59 is inserted through these holes to secure the land side rigidly against the face of the extension 16. The lower face 60 of the forward part of the land side extends from the forward end backwardly on a horizontal plane to near the center, and the attaching plate 61 extends downwardly from the rear end of this face and has a bolt hole 62 through which the bolt 63 is inserted, said bolt also passing through the bolt hole 24 to still further secure the land side to the standard. The lower face 64 of the rear part of the land side is off-set upwardly relative to the lower face of the attaching plate 61.

The heel protector 65 is a rectangular block fitting against the face 64 flush with the lower face of the attaching plate 61 and extending from the attaching plate backwardly to the rear end of the land side. An attaching plate 66 extends upwardly and forwardly from the heel protector and fits inside of the forward end of the turn-buckle support 20, there being bolt holes 67 and 68 registering with the bolt holes 25 and 26 and bolts 69 and 70 are inserted through the parts to hold the heel protector rigidly in place.

The locking wedge 71 comprises a wedge 72 having beveled faces 73 and 74 and an extra beveled lip 75. A neck 76 extends from the point of the wedge and a flat head 77 extends from the neck.

The plow point 78 comprises a straight flat supporting bar 79 having a rectangular opening 80 in its rear end, the point portion 81 extending forwardly from the supporting bar 79, the cutting edge 82 extending from the tip of the point portion 81, backwardly and upwardly and connecting with the cutting flange 43, and the thin hooked beveled edge 83 extending from the opposite side and overlapping the edge 49 of the plow share, the tongue 84 extending backwardly from the point portion 81 flush with the lower face of the point and leaving a socket 85 between the hooked beveled edge 83 and the tongue 84, the rear side 86 of the tongue 84 being transversely inclined to make a hook.

The plow share is placed in position with the point 50 resting upon the tongue 84 and the hooked beveled edge 49 hooked under the edge 83. The plow point 78 is placed in position upon the standard with the inclined edge 29 engaging the inclined face 86 and the support 18 fitting the hooked flange 54, and the locking wedge 71 is inserted from the land-side through the openings 22 and 80, the lip 75 serving to push the bar 79 backwardly and draw the point 29 against the hook 86.

The point support 18 engages behind the hooked flange 54 and presses the hooked flange 54 into the hooked beveled edge 83 so that the plow share cannot be withdrawn or displaced without removing the locking wedge 71.

The wedge lock 87 comprises the lock member 88 having a vertically elongated opening 89 to receive the head 77 longitudinally and to hold the head 77 when turned crosswise of the opening, the hammer head 90 extending from the lock 88, and the handle 91 extending from the head and lock at substantially a right angle. The handle 91 and hammer head 90 are used to drive the locking wedge 71 firmly into place, draw the point support 18 tightly against the hooked flange 54, and press the hooked flange 54 tightly against the hooked beveled edge 83. Then the lock is applied by turning the slot 89 to a horizontal position and passing it over the head 77 and then pressing downwardly on the handle 91 to bring the slot 89 to an upright position straddle of the neck 76. The parts are so constructed that the application of the lock draws the wedge 71 firmly into place and the handle extends backwardly and upwardly out of the way. The handle 91 may be used in operating the turn-buckle 13 as well as in operating the hammer.

A bolt 92 is inserted through the lower screw-eye 14 and through the opening 27 in the turn-buckle support 20.

The upper plow share brace 93 is a stiff metal bar having one end 94 curved to fit against the standard, said curved end having an opening 95 registering with an opening 96 in the standard, and the other end 97 of the bar is enlarged, flattened and curved and has a bolt hole 98 registering with the bolt hole 38 in the mold board, a series of rivet holes 99 registering with the rivet holes 37 in the mold board, and a slot 100 opening downwardly.

The lower plow share brace 101 is placed in position with a bolt 102 inserted through the bolt hole 24 in the standard and through the end of the brace 101. The brace 93 is placed against the rear of the mold board and rivets 103 are placed in the openings 37 and 99. Then the end of the brace 101 is brought into position and a bolt 104 is inserted through the brace 101, through the opening 98, and through the opening 38. The upper mold board brace 105 is placed with one end inside of the end 94 and a bolt 106 is inserted through the standard opening 96, through the brace opening 95, and through the end of the brace 105. A bolt 107 is inserted through the mold board opening 39 and through the brace 105.

When the plow share 46 is applied, the stud 47 passes upwardly into the slot 100 and the lug 48 holds the outer rear end of the plow share from swinging forwardly or outwardly, and the lower end of the head 97 presses against the rear face of the plow share to hold it from swinging inwardly or backwardly.

The draft adjuster 108 is shown in detail in Fig. 16. The adjuster plate 109 has a series of perforations 110 and straps 111 and 112 extend backwardly and inwardly from the ends of the plate, one on each side of the forward end of the beam, and bolts 113 are inserted through the straps and through the bolt holes 2 in the plow beam to secure the plate 109 rigidly in place. The toggle link 114 has a head 115 upon its rear end, said head passing through any desired one of the openings 110. The locking ring 116 has a large opening 117 through which the head 115 will pass and a throat 118 leading from the opening 117 through which the head 115 will not pass, so that when the link 114 is passed through an opening 110 the lock 116 is placed in position for the head 115 to pass through the opening 117 and then the lock is slipped downwardly to bring the link 114 into the throat 118 so that the link cannot be drawn through the opening 110. The ring 119 is placed upon the link 114, said ring having a circular opening 120 and an extension opening 121 leading from the circular opening. The toggle hook 122 is hinged to the forward end of the link 114 by a pin 123 and has a head 124 upon its other end so that when the toggle hook is turned upwardly and backwardly until the head 124 rests upon the link 114 the ring 119 will pass over the head 124, there being a lug 125 extending upwardly from the head 124 which passes through the extension slot 121, and after the ring has passed over the head it is rotated to bring the extension slot 121 out of register with the lug 125. Before applying the ring the head 124 may be passed through the ring of whatever attachment is to be employed.

By manipulating the lock 116 the toggle hook may be readily removed from the plate 109 and the head 115 moved from one opening to another as desired to adjust the draft connection to the right or left in a horizontal plane or up and down so as to control the width of furrow the plow will take and the depth to which the plow will enter the ground. By manipulating the bolt 9 from one hole 7 to another the forward end of the plow beam may be raised or lowered, and by manipulating the turn-buckle 13 the plow beam may be still further and more accurately adjusted and the turn-buckle serves as a brace between the rear end of the plow beam and the rear part of the land-side.

Various changes may be made in the details of construction without departing from the spirit of my invention as claimed.

I claim:

1. A plow beam standard, a point support extending forwardly from the lower end of the standard, a plow share having a hooked flange extending around the point support, a point having a hooked beveled edge extending around the hooked flange of the plow share, and means for keying the point to the standard.

2. In a plow, a standard, a land-side bolted to the standard, a flange extending laterally from the standard, a mold board bolted to the flange and extending across the standard, a shin bolted to the mold board, a point support extending forwardly from the lower end of the standard, a plow share having a hooked flange engaging the point support, and a plow point having a hooked beveled edge extending around the hooked flange.

3. In a plow, a standard, a land-side bolted to the standard, a heel protector bolted to the standard in line with the land-side, a point support extending forwardly from the lower end of the standard, a plow share having a hooked flange extending around the point support, a plow point having a hooked beveled edge extending around the plow share hooked flange, a supporting bar extending backwardly from the point in line with the land-side, a locking wedge inserted through the supporting bar and through the standard, and a wedge lock for holding the locking wedge in place.

4. In a plow, a standard, a land-side support connected to the lower end of the standard, a plow point extending forwardly from the standard, a mold board bolted to the standard, a supporting bar extending backwardly from the plow point alongside of the land-side support, a locking wedge inserted through the supporting bar and through the land-side support, a neck extending from the locking wedge, a flat head extending from the neck, and a wedge lock having an elongated slot to receive the flat head one way; said wedge lock being applied to the head and turned upon the neck to hold the wedge in place.

5. In a plow, a standard, a land-side bolted to the standard, a plow share hooked around the standard, a plow point hooked around the plow share, means for locking the plow point in position, a mold board bolted to the standard, and braces inserted between the mold board and standard.

In testimony whereof I have signed my name to this specification.

ANDREW SALTZER.